United States Patent [19]
Moore et al.

[11] Patent Number: 5,934,745
[45] Date of Patent: Aug. 10, 1999

[54] MOTOR VEHICLE BODY

[75] Inventors: Thomas S. Moore, Northville; Delbert D. DeRees, Romeo; Donald E. Jay, Troy, all of Mich.

[73] Assignee: DaimlerChrysler Corporation, Auburn Hills, Mich.

[21] Appl. No.: 08/892,461

[22] Filed: Jul. 14, 1997

Related U.S. Application Data

[63] Continuation of application No. 08/540,297, Oct. 6, 1995, abandoned.

[51] Int. Cl.⁶ .................................................. B62D 25/00
[52] U.S. Cl. .......................... 296/197; 296/203; 296/185
[58] Field of Search ..................... 296/197, 196, 296/191, 185, 193, 210, 208

[56] References Cited

U.S. PATENT DOCUMENTS

| | | |
|---|---|---|
| 872,031 | 11/1907 | Thomas et al. |
| 1,220,999 | 3/1917 | Booth. |
| 1,953,515 | 4/1934 | Smith ........................... 296/28 |
| 2,148,950 | 2/1939 | Maier ........................... 296/28 |
| 2,234,781 | 3/1941 | Schjolin ....................... 296/28 |
| 2,254,458 | 9/1941 | Swallow ....................... 296/28 |
| 2,306,416 | 12/1942 | Waterhouse, Jr. ........... 296/28 |
| 2,362,071 | 11/1944 | Ledwinka et al. .......... 296/28 |
| 2,380,031 | 7/1945 | Deisley et al. .............. 296/28 |
| 2,383,029 | 8/1945 | Ulrich .......................... 296/28 |
| 2,637,592 | 5/1953 | Karlby ......................... 296/28 |
| 2,645,519 | 7/1953 | Stanfield et al. ............ 296/28 |
| 2,656,214 | 10/1953 | Alamagny .................... 296/28 |
| 2,678,231 | 5/1954 | Barenyi ........................ 296/28 |
| 2,687,325 | 8/1954 | Lindsay ........................ 296/28 |
| 2,693,982 | 11/1954 | Barenyi ........................ 296/28 |
| 2,700,570 | 1/1955 | Barenyi ........................ 296/28 |
| 2,700,571 | 1/1955 | Barenyi ........................ 296/28 |
| 2,710,770 | 6/1955 | Barenyi ........................ 296/28 |
| 2,723,154 | 11/1955 | Barenyi ........................ 296/28 |
| 2,733,096 | 1/1956 | Waterhouse et al. ........ 296/28 |
| 2,797,952 | 7/1957 | Barenyi et al. .............. 296/28 |
| 2,797,953 | 7/1957 | Barenyi ........................ 296/28 |
| 2,814,524 | 11/1957 | Porsche et al. .............. 296/28 |
| 2,841,439 | 7/1958 | Schwenk ...................... 296/28 |
| 2,880,032 | 3/1959 | Barenyi ........................ 296/28 |
| 2,908,528 | 10/1959 | Richter ......................... 296/28 |
| 2,921,812 | 1/1960 | Barenyi ........................ 296/28 |
| 2,973,220 | 2/1961 | White ........................... 296/31 |
| 2,986,423 | 5/1961 | Barenyi ........................ 296/28 |
| 3,003,809 | 10/1961 | Barenyi ........................ 296/28 |
| 3,021,172 | 2/1962 | Fiala et al. .................. 296/28 |

(List continued on next page.)

FOREIGN PATENT DOCUMENTS

| | | | |
|---|---|---|---|
| 725463 | 12/1932 | France .......................... 296/191 |
| 2698601 | 6/1994 | France .......................... 296/197 |

*Primary Examiner*—Joseph D. Pape
*Attorney, Agent, or Firm*—Roland A. Fuller, III

[57] ABSTRACT

A motor vehicle body which includes a left-hand outer body panel, a left-hand inner body panel, a right-hand inner body panel, and a right-hand outer body panel. The four body panels are capable of being easily secured together at the longitudinal midline of the motor vehicle body. In another aspect, a motor vehicle body includes a plurality of interconnectable body panels including a body panel having a generally-vertical side and a horizontal appendage extending from the vertical side. The horizontal appendage is tapered circumferentially from its proximal end to its distal end. In another aspects a motor vehicle body has a plurality of interconnectable body panels including a body panel having an integral door frame member and an integral front fender liner having an integral inner splash shield. Alternatively, or in addition thereto, the motor vehicle body may have a body panel having an integral roof frame member and an integral front fender liner having an integral inner splash shield. In another aspect, a motor vehicle body includes four complementary body panels being capable of being secured together providing a roof frame, a floor, a front, a back, and two sides of a motor vehicle, the body panels forming a plenum therebetween.

36 Claims, 2 Drawing Sheets

U.S. PATENT DOCUMENTS

| | | | |
|---|---|---|---|
| 3,037,808 | 6/1962 | Barenyi | 296/28 |
| 3,061,361 | 10/1962 | Barenyi | 296/28 |
| 3,323,608 | 6/1967 | Eggert, Jr. | 180/54 |
| 3,331,627 | 7/1967 | Schroder et al. | 296/31 |
| 3,415,568 | 12/1968 | Gugelot et al. | 296/31 |
| 3,423,122 | 1/1969 | Wessells, III | 296/28 |
| 3,423,123 | 1/1969 | Wessells, III | 296/28 |
| 3,550,948 | 12/1970 | Thompson, Jr. | 296/28 |
| 3,561,813 | 2/1971 | Barenyi et al. | 296/28 |
| 3,596,979 | 8/1971 | Wolfsburg et al. | |
| 4,205,872 | 6/1980 | Bollinger | 296/205 |
| 4,217,970 | 8/1980 | Chika | 180/298 |
| 4,382,626 | 5/1983 | Spooner | 296/31 P |
| 4,391,465 | 7/1983 | Piano | 296/208 |
| 4,521,049 | 6/1985 | Genma et al. | 296/185 |
| 4,555,134 | 11/1985 | Gruna | 296/189 |
| 4,682,809 | 7/1987 | Huss | 180/31 P |
| 4,747,636 | 5/1988 | Harasaki et al. | 296/208 X |
| 4,804,199 | 2/1989 | Picard | 280/33 |
| 4,842,326 | 6/1989 | DiVito | 296/196 |
| 4,865,378 | 9/1989 | Filtri et al. | 296/197 |
| 4,900,083 | 2/1990 | Kumasaka et al. | 296/197 |
| 4,940,282 | 7/1990 | Townsend | 296/204 |
| 5,002,309 | 3/1991 | Vecellio | |
| 5,009,463 | 4/1991 | Saitoh et al. | |
| 5,011,217 | 4/1991 | Simpson et al. | 296/203 |
| 5,094,313 | 3/1992 | Mauws | 180/210 |
| 5,195,779 | 3/1993 | Aoyama et al. | 296/205 X |
| 5,314,230 | 5/1994 | Hutchison et al. | 180/203 |
| 5,354,114 | 10/1994 | Kelman et al. | 296/208 X |

MOTOR VEHICLE BODY

This application is a continuation of application Ser. No. 08/540,297 filed Oct. 6, 1995, now abandoned.

BACKGROUND OF THE INVENTION

1. Field of the Invention

The present invention relates generally to a motor vehicle body and, more particularly, to a motor vehicle body of simple, lightweight construction.

2. Description of the Related Art

As the people of developing nations advance their lifestyles it would be desirable to have a basic transportation motor vehicle available to them which would replace their current modes of transportation, such as the bicycle. It would be desirable that the motor vehicle be capable of transporting four to five adult passengers be lightweight and, therefore, economical to operate, and low cost so that it would be more affordable to the people of the developing nations. To achieve a low cost vehicle, it would be beneficial to have a vehicle body which has a minimum number of parts, is of simple design so that it is easy to manufacture, and is easy to assemble.

It is, therefore, one object of the present invention to provide a motor vehicle body which is capable of holding four to five adult passengers is lightweight, is low cost, has a low number of parts, is of simple design, and is easy to assemble.

SUMMARY OF THE INVENTION

To achieve the foregoing objects, one aspect of the present invention is a motor vehicle body which includes a left-hand inner body panel; a left-hand outer body panel, a right-hand inner body panel; and a right-hand outer body panel. The four body panels are capable of being secured together at the longitudinal midline of the motor vehicle body.

Another aspect of the present invention is a motor vehicle body which includes a plurality of interconnectable body panels including a body panel having a generally-vertical side and a horizontal appendage. The horizontal appendage has a proximal end and a distal end, extending from the generally-vertical side from its proximal end, and is tapered circumferentially from its proximal end to its distal end.

Yet another aspect of the present invention is a motor vehicle body which has a generally-vertical right side; a generally-vertical left side; a floor connecting the generally-vertical right side to the generally-vertical left side; and a transverse tunnel in the floor extending from the generally-vertical right side to the generally-vertical left side of the motor vehicle body.

Still another aspect of the present invention is a motor vehicle body which has a plurality of interconnectable body panels including a body panel having an integral door frame and an integral front fender liner having an inner splash shield. Alternatively or in addition thereto, the motor vehicle body has a body panel having an integral roof frame and an integral front fender liner having an inner splash shield.

A further aspect of the present invention is a motor vehicle body which includes four body panels securable together to provide a roof frame, a floor, a front, a back, and two sides of a motor vehicle. In this aspect of the present invention, the body panels form a plenum therebetween.

Other objects features, and advantages of the present invention will be readily appreciated as the same becomes better understood after reading the subsequent description taken in conjunction with the appendant drawings.

DESCRIPTION OF THE PREFERRED EMBODIMENTS

Figure 1:
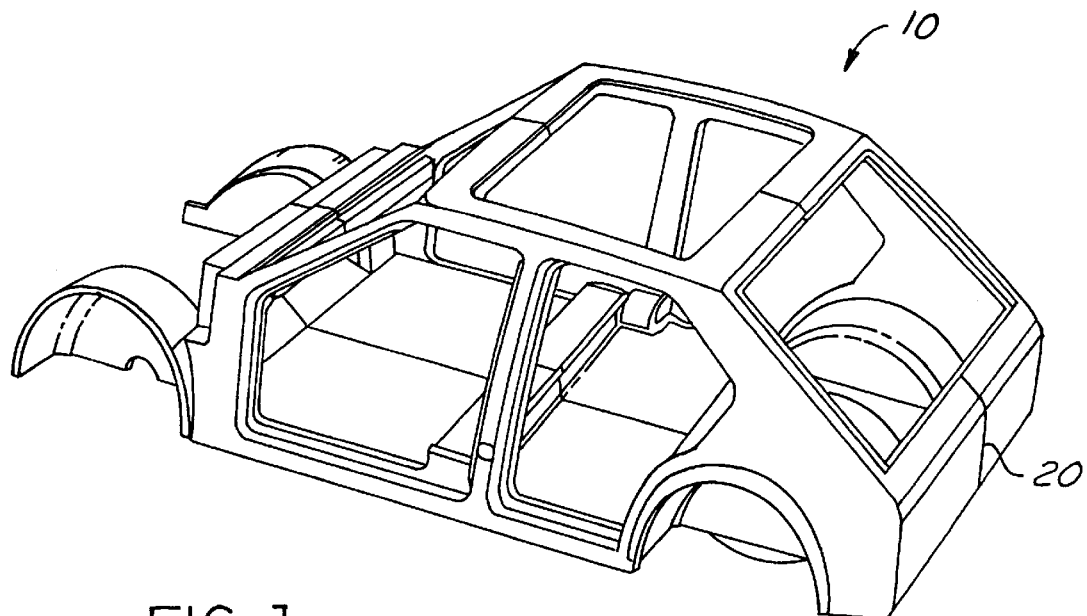
FIG. 1 is a perspective view of a preferred motor vehicle body of the present invention.

A motor vehicle body according to the present invention, designed to hold five adult passengers, is shown in FIG. 1 and designated by reference numeral 10. Motor vehicle body 10 may be formed from the four parts which are shown in exploded view in FIG. 2. The four motor vehicle body parts include left-hand outer body panel 12, left-hand inner body panel 14, right-hand inner body panel 16, and right-hand outer body panel 18. The four body panels are secured together at longitudinal midline 20 of motor vehicle body 10. Longitudinal midline 20 is shown in the preferred location, i.e., the centerline of motor vehicle body 10.

Left-hand outer body panel 12 has generally-vertical side 22 which includes front door frame member 24 having tunnel cap 26 therein, back door frame member 28, "A" pillar member 30, "B" pillar member 32 having opening 34 therein, and "C" pillar member 36. Door frame members 24 and 28 also include frames for windows.

Left-hand outer body panel 12 also has front fender liner 38 with inner splash shield 40, plenum box member 42, windshield frame member 44, front header member 46, rear header member 48, roof frame member 50, rear fender 52, back window frame member 54, and back panel member 56. Plenum box member 42 includes vertical wall 58 which joins horizontal wall 60 which, in turn, joins angular wall 62.

Members such as fender liner 38, plenum box member 42, front header member 46, rear header member 48, and back panel member 56 may all be considered horizontal appendages extending from generally-vertical side 22. The appendages each have a proximal end which joins generally-vertical side 22 and a distal end which is opposite the proximal and. For example, front header member 46 has proximal end 66 and distal end 68.

For reasons which will be discussed hereinbelow, it is preferred that the appendages be tapered circumferentially from their proximal ends to their distal ends. Preferably, the taper (or draft) be at most about 5°, and most preferably, the taper is about 1.5°.

Right-hand outer body panel 18 is basically the mirror image of and has the same members as left-hand outer body panel 12. Some of the members of right-hand outer body panel 18 are labeled with the same reference numerals as those used for left-hand outer body panel 12, but with an apostrophe (') suffix.

Left-hand inner body panel 14 has generally-vertical side 70, which includes front door frame member 72, back door frame member 74, "A" pillar member 76, "B" pillar member 78, and "C" pillar member 80. Door frame members 72 and 74 also include window frame segments. The exterior of vertical side 70 includes webs 81 to improve the structural stability of the motor vehicle body. Webs 81 are strips of plastic which extend outwardly from the exterior surface of vertical side 70. When left-hand outer body panel 12 is placed over left-hand inner body panel 14, webs 81 extend from body panel 14 to body panel 12 to provide the reinforcement desired.

Left-hand inner body panel 14 also has toe pan member 82; dash member 84; windshield frame member 90; front header member 92; rear header member 94; roof frame member 96; back window frame member 98; back panel member 100; floor member 102; rear wheel housing 104; spare tire housing member 106; filler neck housing 108 (which adds further structural support to motor vehicle body 10); and front seat support member 110 which is a transverse projection forming transverse tunnel 112 thereunder. As may best be seen on right-hand inner body panel 16, the dash member, referenced 84', includes vertical wall 86', and angular wall 88'. Front header member 92 and rear header member 94 each have a bottom surface and a side wall extending upwardly from each side of the bottom surface. Front seat support 110, which adds side-to-side support to motor vehicle body 10, is elevated above floor member 102 and has hole 114 therethrough which leads from filler neck housing 108 into tunnel 112.

Figure 2:
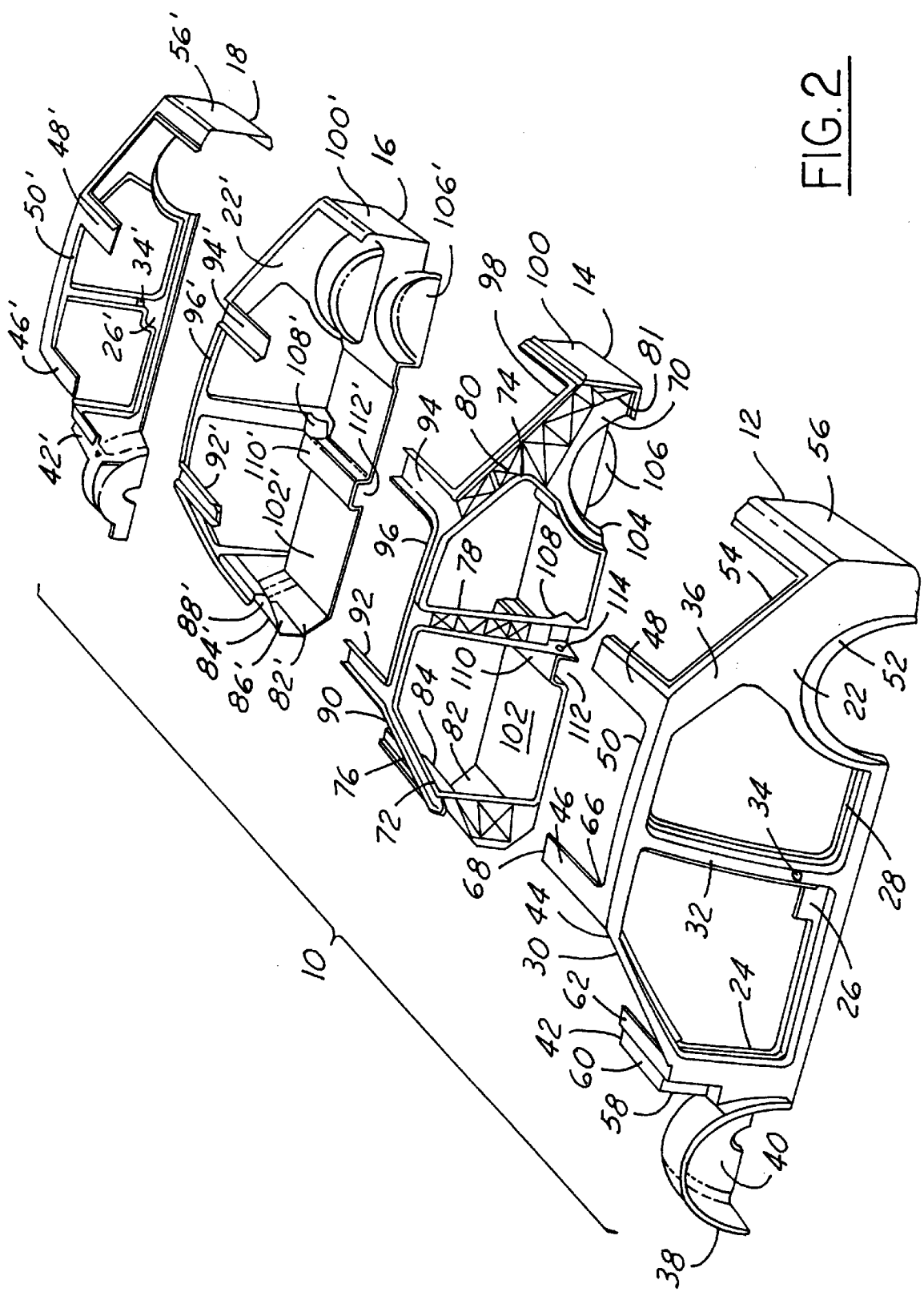
FIG. 2 is an exploded perspective view of the body panels which form the preferred motor vehicle body of FIG. 1.

When left-hand inner body panel 14 is connected to right-hand inner body panel 16, floor members 102 and 102' form the floor of motor vehicle body 10. In addition, front seat support member 110 joins front seat support member 110' and extends from generally-vertical left side 22 to generally-vertical right side 22' and forms transverse tunnel 112/112' thereunder. Transverse tunnel 112/112' is capped on its ends with tunnel caps 26 and 26' and may enclose a gas tank therein. Motor vehicle body 10, as shown in FIG. 2, has two openings, 34 and 34', one in the "B" pillar of each of the outer body panels. Furthermore, motor vehicle body 10 has two filler neck housings, one in each of the inner body panels. Therefore, motor vehicle body 10 is structured so that a gas tank may be designed to be filled from either the left side or the right side of the motor vehicle. Gas would be filled through either opening 34 or 34', pass through filler neck housing 108 or 108', then into transverse tunnel 112/112'.

Right-hand inner body panel 16 is basically the mirror image of and has the same members as left-hand inner body panel 14. Some of the members of right-hand inner body panel 16 are labeled with the same reference numerals as those used for left-hand inner body panel 14, but with an apostrophe (') suffix.

When the four body panels 12, 14, 16, and 18, are secured together to form motor vehicle body 10, the space between the plenum box members, the dash members and the toe pans, serves as the plenum for the motor vehicle. The plenum, in which outside air is collected for the ventilation, heating, and defrosting of the motor vehicle, is designated by reference numeral 118 in FIG. 3. Holes 116 in vertical wall 58 and horizontal wall 60 provide air inlets into the plenum. Openings 117 are formed in the bottom of the plenum to allow collected moisture to drain out of the plenum.

The four body panels, 12, 14, 16, and 18, may be formed by molding, e.g., injection molding, a polymeric material such as a plastic composite material. Thus, each body panel is a single piece and all the features shown on each of the body panels in FIG. 2 are integral. Advantageously, the color of the motor vehicle body may be provided by pigmenting the plastic material so that painting will not be required and small chips in the motor vehicle body are not as noticeable as they are in conventional metal motor vehicle bodies. In addition, eliminating the painting process in the manufacturing of the motor vehicle body saves in manufacturing cost and eliminates the usual cost of purifying the effluent air from the painting process. Alternatively, the four body panels may be formed primarily of: polymeric material with some features, such as the floor members, formed of metal.

Suitable plastic materials for forming the panels preferably have a tensile modulus of at least about $0.5 \times 10^6$ psi and include polyester terephthalate, propylene, and polyolefin rubber/propylene blends. A specific suitable plastic composite material is a polyester terephthalate filled with 15 weight percent fiberglass which is available from Hoechst-Celanese, Frankfurt, W. Germany, under the tradename "CELSTRAN PET-G15". The length of the fiberglass in "CELSTRAN PET-G15" is about ½ inch.

Being molded, the thickness of the various features on the body panels may be easily controlled as desired. A suitable average thickness is from about 2 to about 5 millimeters thick, preferably, about 3 millimeters thick. In contrast, if the body panels and features are stamped from sheet metal, the thickness of the various features is not as easily controlled In addition, when made from a polymeric material, the weight of the motor vehicle body of the present invention may be lower than traditional vehicle bodies.

The injection molding process typically employs a male and a female mold. The male and female molds are preferably designed to provide a taper in the molded part in the direction from the male mold to the female mold to allow for easy removal of the molds. For this reason, the appendages of the body panels of the present invention are tapered from the generally-vertical sides of the body panels to the ends of the appendages.

Figure 3:
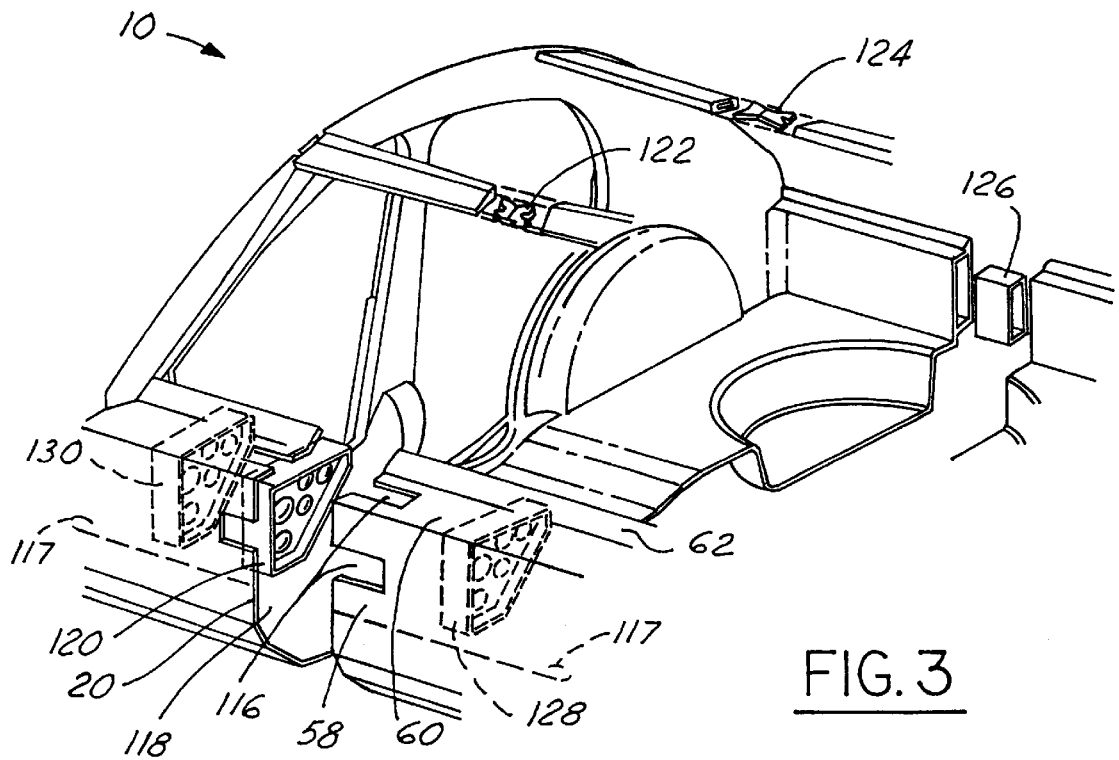
FIG. 3 is an exploded perspective view of part of the preferred motor vehicle body of FIGS. 1 and 2.

One way to form motor vehicle body 10 from the four body panels is by first connecting left-hand inner body panel 14 to right-hand inner body panel 16 by using various couplers as shown in FIG. 3. Although the manner of securing the body panels together is not shown in a step-by-step fashion, one manner is fully described as follows.

To secure the two inner bodies together and form an inner body subassembly, left-hand inner body panel 14 is abutted against right-hand inner body panel 16 so that toe pan members 82 and 82' abut each other, dash members 84 and 84' abut each other, front header members 92 and 92' abut each other at their distal ends, rear header members 94 and 94' abut each other at their distal ends, and back panel members 100 and 100' abut each other. Abutting toe pan members 82 and 82' form the toe pan of motor vehicle body 10, dash members 84 and 84' form the dash of motor vehicle body 10, and abutting back panel members 100 and 100' form the inside of the back panel of motor vehicle body 10.

Front bulkhead coupler 120 (illustrated in FIG. 3) is then positioned evenly over longitudinal midline 20 against abutting dash members 84 and 84', front header coupler 122 is positioned evenly over longitudinal midline 20 inside abutting front header members 92 and 92', rear header coupler 124 is positioned evenly over longitudinal midline 20 inside abutting rear header members 94 and 94', and rear bulkhead coupler 126 is positioned evenly over longitudinal midline 20 against abutting back panel members 100 and 100'. Left-hand front bulkhead 128 and right-hand front bulkhead 130 are also used to secure the body panels together and to provide strength to the motor vehicle body. The left-hand and right hand front bulkheads are placed to the left and to the right of front bulkhead coupler 120, respectively. Adhesive, such as urethane adhesive, and rivets may be used to secure the couplers and bulkheads in place.

Floor members 102 and 102' are designed to overlap when left-hand inner body panel 14 is abutted against right-hand inner body panel 16. Adhesive, such as urethane adhesive, and rivets may be used to secure the overlapping floor members together. With the floor members secured together and the various couplers in place, the inner body subassembly has been formed. During assembly, mechanical fasteners, such as nuts and bolts, x-shaped fasteners, and figure-8-shaped fasteners, may be used to fasten the body panels together to allow handling of the subassembly before the adhesive has cured to a sufficient strength to allow handling of the subassembly without separating the panels.

To complete the formation of motor vehicle body 10, left-hand outer body panel 12 and right-hand outer body panel 18 are secured to the inner body subassembly. Left-hand outer body panel 12 is placed over left-hand inner body panel 14, and right-hand outer body panel 18 is placed over right-hand inner body panel 16 so that plenum box members 42 and 42' abut each other, front header members 46 and 461 abut each other at their distal ends, rear header members 48 and 48' abut each other at their distal ends, and back panel members 56 and 56' abut each other. Abutting back panel members 56 and 56' form the outside of the back panel of motor vehicle body 10.

Outer body panels 12 and 18 are secured to front bulkhead coupler 120, front header coupler 122, rear header coupler 124, and rear bulkhead coupler 126, preferably using adhesive and rivets. Left-hand outer body panel 12 is also secured to left-hand front bulkhead 128, and right-hand outer body panel 18 is secured to right-hand front bulkhead 130 Again, mechanical fasteners may be used to fasten the body panels together to allow handling of vehicle body 10 before the adhesive has cured to a sufficient strength to allow handling of the body without separating the panels.

After the four body panels have been secured together, all seams may be sealed to prevent leakage between the panels and for aesthetic purposes. A hood panel (not shown) which includes front fenders and a front bumper may now be attached to the motor vehicle body. The thus-described hood panel may also be injection molded as one piece. The motor vehicle body may then be attached, e.g. by adhesive and bolts, to a metal vehicle frame, and all auxiliary parts, such as door frames and a top, may be added to the body and frame. Roof frame members 50, 50', 96 and 96' may be designed so that a rollable canvas top may be incorporated therewith. The motor vehicle body is designed for a front-wheel drive motor vehicle which may be operated with a small motor, e.g., a 25-HP motor.

Accordingly, motor vehicle body 10 of the present invention achieves the objects of the present invention in that it is capable of holding four to five adult passengers, is lightweight and low cost, has a low number of parts, is of simple design, and is easy to assemble. In addition, vehicle body 10 has the advantages that it is non-corrosive and is generally easy to repair by patching with a pigmented adhesive.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A motor vehicle body, comprising:
   a left-hand outer body panel having a front header member and a rear header member;
   a left-hand inner body panel having a front header member and a rear header member;
   a right-hand inner body panel having a front header member and a rear header member; and
   a right-hand outer body panel having a front header member and a rear header member, the four body panels being capable of being secured together to form a motor vehicle body having a longitudinal midline and a roof frame having a front and a back, the header members being elongated members extending from the top of the corresponding body panel toward the longitudinal midline of the motor vehicle body, the four front header members being connectable together and forming the front of the vehicle roof frame and the four rear header members being connectable together and forming the back of the vehicle roof frame, the four body panels being securable together at the longitudinal midline of the motor vehicle body, the outer body panels appearing on the outside of the motor vehicle body upon formation of the motor vehicle body and the inner body panels appearing on the inside of the motor vehicle body upon formation of the motor vehicle body.

2. The motor vehicle body of claim 1, wherein,
   the left-hand inner body panel includes an integral dash member and an integral toe pan member and the right-hand inner body panel includes an integral dash member and an integral toe pan member, the two dash members together forming the dash of the motor vehicle body and the two toe pan members together forming the toe pan of the motor vehicle body.

3. The motor vehicle body of claim 1, wherein:
   the left-hand outer body panel includes an integral front fender liner and
   the right-hand outer body panel includes an integral front fender liner.

4. The motor vehicle body of claim 1, wherein:
   the left-hand outer body panel includes an integral front fender liner with an integral inner splash shield and
   the right-hand outer body panel includes an integral front fender liner with an integral inner splash shield.

5. The motor vehicle body of claim 1, wherein:
   the left-hand outer body panel includes an integral plenum box member and
   the right-hand outer body panel includes an integral plenum box member.

6. The motor vehicle body of claim 1, wherein:
   the left-hand inner body panel includes an integral left-hand floor member and the right-hand inner body panel includes an integral right-hand floor member, the left-hand floor member being attached to the right-hand floor member, the attached floor members forming the floor of the motor vehicle body.

7. The motor vehicle body of claim 6, further comprising a transverse projection on the floor forming a transverse tunnel thereunder.

8. A motor vehicle body having a roof frame, comprising:
   a plurality of interconnectable body panels including a first body panel having a generally-vertical side and a horizontal appendage extending from the top of the first body panel, the horizontal appendage having a proximal end and a distal end and extending from the generally-vertical side from its proximal end, the horizontal appendage being tapered circumferentially from its proximal end to its distal end and forming a portion of the roof frame.

9. The motor vehicle body of claim 8, wherein the appendage is tapered from its proximal end to its distal end at an angle of at most about 5°.

10. A motor vehicle body, comprising:
    a left-hand outer body panel;

a left-hand inner body panel;

a right-hand inner body panel; and a right-hand outer body panel, the four body panels each having a generally-vertical side having horizontal appendages having proximal ends and distal ends and extending from the generally-vertical sides from their proximal ends, the horizontal appendages on each panel including a front header member and a rear header member, the horizontal appendages being tapered circumferentially from their proximal ends to their distal ends, the four body panels being capable of being secured together to form a motor vehicle body having a longitudinal midline, the four body panels being securable together at the longitudinal midline of the motor vehicle body, the four front header members being connectable together and the four rear header members being connectable together.

11. The motor vehicle body of claim 10 wherein:

the left-hand inner body panel further includes an integral floor member having a transverse projection thereon, an integral dash member, and an integral toe pan member;

the right-hand inner body panel further includes an integral floor member having a transverse projection thereon, an integral dash member, and an integral toe pan member;

the left-hand outer body panel further includes an integral door frame member, an integral roof frame member, an integral plenum box member and an integral front fender liner with an integral inner splash shield; and the right-hand outer body panel further includes an integral door frame member, an integral roof frame member, an integral plenum box member and an integral front fender liner with an integral inner splash shield, at least one of the generally-vertical side includes a "B" pillar having an opening therein;

the four body panels together forming a plenum therebetween, the two floor members together forming the floor of the motor vehicle body, the two transverse projections serve as a front seat support and form a transverse tunnel thereunder extending from the generally-vertical side of the left-hand inner body panel to the generally-vertical side of the right-hand inner body panel, the opening in the "B" pillar being in fluid communication with the transverse tunnel, the two dash members together forming the dash of the motor vehicle body, and the two toe pan members together forming the toe pan of the motor vehicle body.

12. The motor vehicle body of claim 10, wherein the appendages are tapered at an angle of at most about 5°.

13. A motor vehicle body, comprising:

a left-hand outer body panel including an integral door frame member, an integral roof frame member, an integral plenum box member and an integral front fender liner with an integral inner splash shield;

a left-hand inner body panel including an integral floor member having a transverse projection thereon, an integral dash member, and an integral toe pan member;

a right-hand inner body panel including an integral floor member having a transverse projection thereon, integral dash member, and an integral toe pan member; and a right-hand outer body panel including an integral door frame member, an integral roof frame member, an integral plenum box member and an integral front fender liner with an integral inner splash shields the four body panels each having a generally-vertical side having horizontal appendages having proximal ends and distal ends and extending from the generally-vertical sides from their proximal ends, the horizontal appendages on each panel including a front header member and a rear header member, the horizontal appendages being tapered circumferentially from their proximal ends to their distal ends at an angle of at most about 5°, the four body panels being capable of being secured together to form a motor vehicle body having a longitudinal midline, the four body panels being securable together at the longitudinal midline of the motor vehicle body, the four front header members being connectable together and the four rear header members being connectable together, the four body panels together forming a plenum therebetween, the two dash members together forming the dash of the motor vehicle body, and the two toe pan members tog ether forming the toe pan of the motor vehicle body, at least one of the generally-vertical sides includes a "B" pillar having an opening therein; and the two floor members together forming the floor of the motor vehicle body, the two transverse projections serve as a front seat support and form a transverse tunnel thereunder extending from the generally-vertical side of the left-hand inner body panel to the generally-vertical side of the right-hand inner body panel, the opening in the "B" pillar being in fluid communication with the transverse tunnel.

14. A motor vehicle body, comprising first and second body sections secured together to form the motor vehicle body, each first and second body section comprising an outer panel secured to an inner panel, wherein said outer panels each include a generally vertical sidewall portion and said inner panels include a generally vertical sidewall portion extending along said generally vertical sidewall portion of said outer panels and wherein at least one of said inner and outer panels includes an upper integrally formed generally horizontal appendage such that said upper integrally formed generally horizontal appendage of one of said inner and outer body panels of said first body section connect to said upper generally horizontal appendage of a corresponding one of said inner and outer body panels of said second body section to form a roof portion of said motor vehicle body.

15. The motor vehicle body of claim 14 wherein the outer and inner panel of at least one body section are formed to define a plenum therebetween when the outer and inner panels are secured together.

16. A motor vehicle body, comprising first and second body sections secured together to form the motor vehicle body, each first and second body section comprising an outer panel secured to an inner panel, wherein the first and second body sections comprise left and right body sections, each inner and outer panel formed to define a plenum therebetween when the respective inner and outer panels are secured to define a plenum therebetween when the respective inner and outer panels are secured together such that the plenum extends across the motor vehicle when the left and right body sections are secured together.

17. The motor vehicle body of claim 16 wherein front portions of the inner and outer panels are formed to define the plenum therebetween so that the plenum extends across the front of the motor vehicle when the right and left body sections are secured together.

18. The motor vehicle body of claim 16 wherein each outer body panel member has an integral plenum member, each inner body panel having an integral dash member and an integral toe pan member, the two dash members together form the dash of the motor vehicle body, the two toe pan members together forming the toe pan of the motor vehicle body, the plenum members, toe pan members and dash members defining the plenum therebetween.

19. The motor vehicle body of claim 14 wherein each inner and outer panel is molded from a plastic material.

20. The motor vehicle body of claim 19 wherein the plastic material comprises a fiberglass filled plastic material.

21. The motor vehicle body of claim 19 wherein one of the inner and outer panels of each body section includes webbing extending toward to the other of the inner and outer panels of that body section such that when the inner and outer panels of each body section are secured together the webbing extends from the inner panel to the outer panel of each body section.

22. The motor vehicle body of claim 21 wherein the webbing comprises plastic strips molded as part of the panel that includes the webbing.

23. The motor vehicle body of claim 19 wherein the motor vehicle body includes a floor formed by one of the inner and outer panels of each body section having a floor member molded therewith that mates with the floor member of the other body section.

24. The motor vehicle body of claim 23 wherein the floor includes an upward projection extending transversely across the motor vehicle body.

25. The motor vehicle body of claim 24 wherein the projection serves a front seat support.

26. The motor vehicle body of claim 24 wherein the projection forms a transverse tunnel for housing a gas tank, one of the body sections including an opening formed therein in fluid communication with the gas tank so that said opening serves as a gas filler opening.

27. The motor vehicle body of claim 14 wherein at least one of the body sections includes an integral door frame member and an integral front fender liner having an integral inner splash shield.

28. The motor vehicle of claim 14 wherein at least one of the body sections includes an integral roof frame member and at least one of the body sections includes an integral floor member.

29. The motor vehicle body of claim 19 wherein at least one of the body sections includes an integral door frame member and an integral front fender liner having an integral inner splash shield.

30. The motor vehicle of claim 19 wherein at least one of the body sections includes an integral roof frame member and at least one of the body sections includes an integral floor member.

31. A motor vehicle body, comprising:
a left body section and a right body section, said left and right body sections including left and right inner body panels and left and right outer body panels, respectively, said outer body panels including generally vertical sidewalls and a plurality of appendages extending generally transversely from and integrally formed with said sidewalls, said appendages of said left and right outer body panels having distal ends such that said distal ends of said appendages of said left and right outer body panels connect to one another, said left and right inner body panels each including a generally vertical sidewall which extends along said generally vertical sidewalls of said left and right outer body panels, respectively, said left and right inner body panels each including a generally horizontal floor portion integrally formed with said generally vertical sidewall.

32. The motor vehicle body according to claim 31, wherein said left and right inner body panels include a plurality of appendages extending generally transversely from and integrally formed with said sidewalls, said appendages of said left and right inner body panels having distal ends such that said distal ends of said appendages of said left and right inner body panels connect to one another.

33. The motor vehicle according to claim 31, wherein each of said left and right inner and outer body panels includes a door frame portion.

34. A motor vehicle body, comprising:
a left body section and a right body section, said left and right body sections including left and right inner body panels and left and right outer body panels, respectively, said outer body panels including generally vertical sidewalls and a plurality of appendages extending generally transversely from and integrally formed with said sidewalls, said appendages of said left and right outer body panels having distal ends such that said distal ends of said appendages of said left and right outer body panels connect to one another, said left and right inner body panels each including a generally vertical sidewall which extends along said generally vertical sidewalls of said left and right outer body panels, respectively, wherein said left and right inner body panels include a plurality of appendages extending generally transversely from and integrally formed with said sidewalls, said appendages of said left and right inner body panels having distal ends such that said distal ends of said appendages of said left and right inner body panels connect to one another.

35. The motor vehicle according to claim 34, wherein each of said left and right inner and outer body panels includes a door frame portion.

36. The motor vehicle body according to claim 14, wherein one of said inner and outer panels includes a lower integrally formed generally horizontal appendage such that said lower integrally formed generally horizontal appendage of one of said inner and outer body panels of said first body section connect to said lower generally horizontal appendage of a corresponding one of said inner and outer body panels of said second body section to form a floor portion of said motor vehicle body.

* * * * *